Oct. 19, 1948.    E. E. GARRETT    2,451,820
APPARATUS FOR EXPOSING AND PROCESSING
PHOTOGRAPHIC FILM
Filed Sept. 20, 1947    5 Sheets-Sheet 1

FIG. 1

INVENTOR
Elmer E. Garrett
BY Donald L. Brown
Attorney

Oct. 19, 1948.  E. E. GARRETT  2,451,820
APPARATUS FOR EXPOSING AND PROCESSING
PHOTOGRAPHIC FILM
Filed Sept. 20, 1947  5 Sheets-Sheet 2

FIG. 2

INVENTOR
Elmer E. Garrett
BY Donald L. Brown
Attorney

Oct. 19, 1948.  E. E. GARRETT  2,451,820
APPARATUS FOR EXPOSING AND PROCESSING
PHOTOGRAPHIC FILM
Filed Sept. 20, 1947  5 Sheets-Sheet 3

INVENTOR
Elmer E. Garrett
BY Donald L. Brown
Attorney

Oct. 19, 1948.　　　　　E. E. GARRETT　　　　　2,451,820
APPARATUS FOR EXPOSING AND PROCESSING
　　　　　　　PHOTOGRAPHIC FILM
Filed Sept. 20, 1947　　　　　　　　　　5 Sheets-Sheet 4

FIG. 4

INVENTOR
Elmer E. Garrett
BY
Donald L. Brown
Attorney

Patented Oct. 19, 1948

2,451,820

UNITED STATES PATENT OFFICE 2,451,820

APPARATUS FOR EXPOSING AND PROCESSING PHOTOGRAPHIC FILM

Elmer E. Garrett, Freeport, N. Y., assignor to Polaroid Corporation, Cambridge, Mass., a corporation of Delaware Application September 20, 1947, Serial No. 775,364

15 Claims. (Cl. 95—13)

This invention relates to photography and more particularly to camera apparatus.

An object of the invention is to provide camera apparatus adapted to perform a plurality of operations upon an assembly of materials for photographically exposing a sheet of light-sensitive film incorporated in the assembly and for processing the exposed film.

Another object of the invention is to provide camera apparatus wherein a positive print of the subject image to which a film is photographically exposed is formed on one of the materials employed.

A further object of the invention is to provide camera apparatus adapted to use with a composite film unit comprising a light-sensitive film, an opaque panel displaceably covering the film, and a fluid contained for release between the film and panel and wherein the opaque panel may be displaced, the film photographically exposed, and the entire unit progressively subjected to compression for releasing and spreading the fluid between the exposed film and the covering panel.

Still another object of the invention is to provide a camera incorporating aforesaid mechanism and adapted to releasably mount a plurality of units of the aforementioned type constituting a form of film pack in such a manner that they may successively be positioned in the focal plane, photographically exposed, compressively processed, and removed from the camera for inspection of the processed material.

Other objects of the invention include the provision of motor-driven and manually actuated mechanism, interlocking means for automatic performance of aforesaid operations in predetermined coincidence and sequence, and separable pressure roller means actuated by a universal form of drive.

Further objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

The novel apparatus of the invention is particularly adapted to be part of a camera, and to perform a plurality of operations relative to the exposure and processing of a light-sensitive film incorporated in a composite film unit. The latter comprises an envelope, an opaque sheet normally covering the film and displaceable therefrom for exposing said film, and a processing fluid contained in the unit in such a way as to be released between the film and covering sheet after exposure of said film and return of the covering sheet to normal position. The cumulative performance of said operations is adapted to provide processing of the film and more particularly to provide formation of a positive photographic print of the subject image of an exposure. Processing of the film and production of a positive print is possible of accomplishment without the necessity of recourse to processing tanks, fluid applicators, and the like and avoids bringing a processing fluid and elements of the apparatus in contact with one another during any stage of said operation. The apparatus is adapted to perform a plurality of operations comprising positioning the film in the focal plane, removing the opaque covering sheet from the light-sensitive surface of the film for photographic exposure of said film, photographically exposing the film, returning the opaque covering sheet to its original position after exposure of the film, and progressively subjecting the assembly to compression to provide release and a predetermined spreading of the processing fluid between and throughout facing areas of the film and the covering sheet, and ultimately advancing a leading portion of the compressed assembly to a position exterior of the camera casing for manual removal of the materials therefrom.

Figure 1:
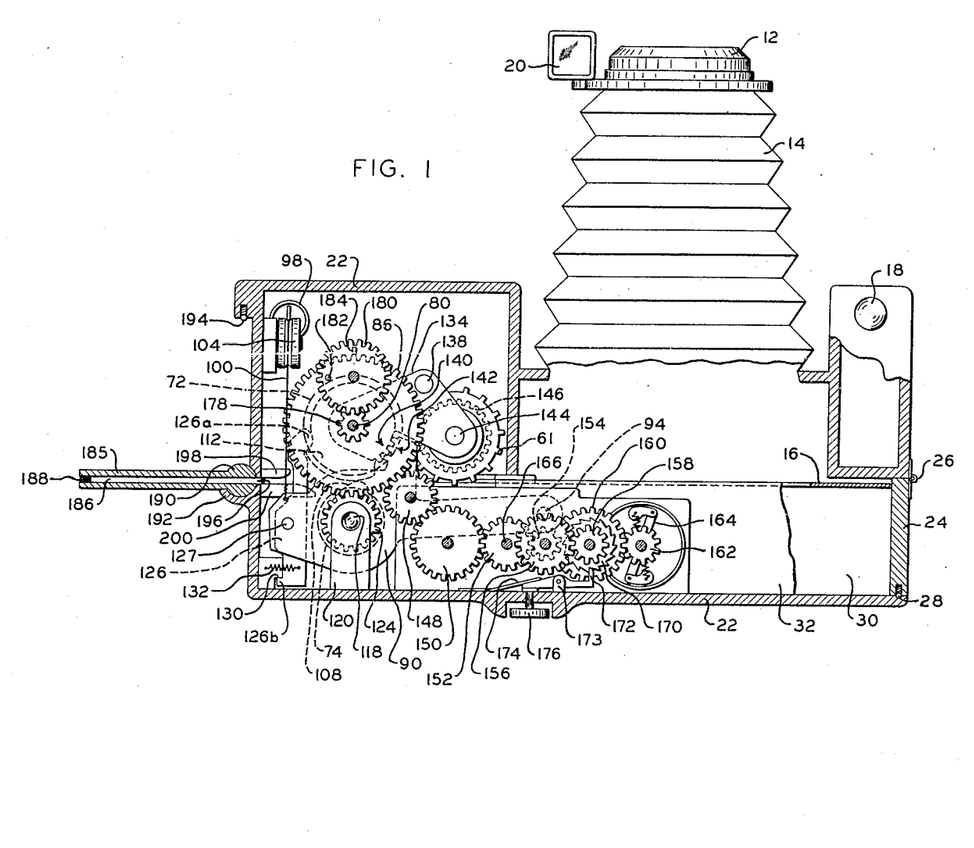
Figure 1 is a somewhat schematic elevation view of apparatus of the invention, partly in cross section and with parts broken away.

Referring to Fig. 1, a camera incorporating mechanism of the invention is schematically illustrated in elevation with parts shown in cross section. Film exposure means of any suitable conventional design may be employed therein as, for example, lens 12, bellows 14, framing plate 16, shutter release 18, and view finder 20, it being understood that appropriate means (not shown) for adjusting the bellows, and for varying shutter speed, diaphragm aperture, and focus are also incorporated with the camera. Camera casing 22 comprises a door 24 pivotally secured to other casing portions by a hinge 26 and a latch 28, said door providing access means to a chamber 30. Chamber 30 is formed by aforesaid casing portions 22 and 24, by web portions 32 and 32a (Fig. 2) and by framing plate 16. The aforesaid chamber is adapted to releasably hold a magazine 34 (Fig. 2), said magazine supplying a plurality of said film units 36 (Figs. 2 and 3) adapted to use with the apparatus.

Figure 2:
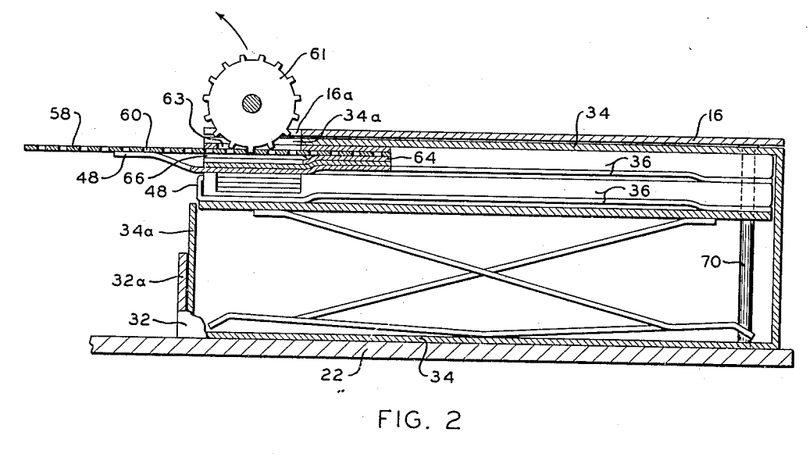
Fig. 2 is a schematic elevation view of a plurality of assemblies of photographic materials mounted within magazine means of the camera apparatus.
Figure 3:
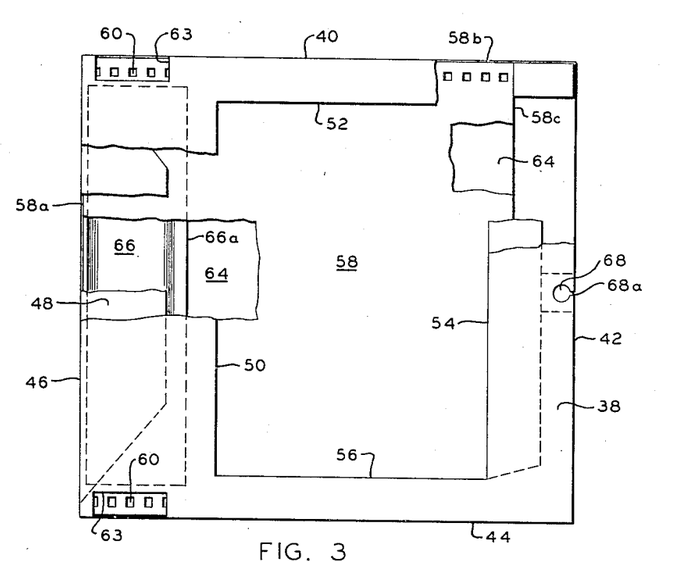
Fig. 3 is a schematic plan view of an assembly of photographic materials suitable for use in conjunction with camera apparatus of the invention.

An individual composite film is shown in detail in the plan view of Fig. 3 and sectional view of Fig. 2. Said unit is described at length herein to provide a clear understanding of the operation of apparatus of the invention relative thereto. The assembly comprises an envelope 38 formed, for example, of an opaque paper, having folded closed edge portions 40, 42 and 44, and open edge portions 46, said open portions 46 permitting a sheet material to be withdrawn from the envelope or returned within the envelope. One of said edge portions 46 is of an extended length and comprises a flap 48, said flap being an inwardly folded prolongation of the under wall of the envelope. Relative to the mounting of film units 36 in magazine 34 and mounting of the magazine in chamber 30 it will be noted in Fig. 2 that web portion 32a for holding magazine 34 and portion 34a of said magazine are shorter than other web and magazine portions, respectively. The reduced length of said portions provides an aperture through which a plurality of units 36 may be loaded in the magazine and permits both slidable movement of a sheet material from envelope 38 and slidable movement of assembly 36 per se from the magazine.

As shown in Fig. 3, the upper wall of envelope 38 comprises an aperture for exposure of film contained in the envelope, said aperture being defined by edges 50, 52, 54 and 56. A sheet or layer of material 58 as, for example, a substantially rigid sheet of a paper material having an underlying surface adapted to have a positive photographic print formed thereupon, is slidably mounted in the envelope. Leading, side and trailing edges of sheet 58 are respectively designated 58a, 58b, and 58c. Sprocket holes 60 are provided along marginal portions of sheet 58 and are adapted to cooperate with sprockets 61 and 62 (Figs. 2 and 4) for removal of said sheet 58, apertures 63 being provided in the envelope to permit the sprockets to pass therewithin and engage said sheet 58. Portion 34a of magazine 34 and portion 16a of framing plate 16 are cutout portions permitting entrance of the sprockets to sheet material 58.

Rotation of sprockets 61 and 62 in a clockwise direction, assuming the viewing position of Figs. 1 and 2, provides slidable displacement of sheet 58 from an underlying photosensitive film 64 for exposure of said film. Rotation of the sprockets in a counterclockwise direction provides return of sheet 58 within the envelope and superposition with film 64. When sheet 58 is displaced from film-covering position, envelope flap 48 is unfolded and caused to extend outwardly, as shown in Fig. 2, said flap being adapted both to be engaged by propulsive means for drawing the composite film unit between compressive surfaces and to serve for manually withdrawing said film unit from the camera. Underlying covering sheet 58, a sheet of film 64, with a light-sensitive surface thereof face up, is attached to the under wall of the envelope, the area of said film surface framed within the envelope aperture being adapted to photographic exposure through conventional camera means when opaque sheet 58 is removed from covering position. A fluid container 66, releasably holding a supply of film-processing fluid, is fixedly mounted upon the facing surface of film 64 so as to be positioned adjacent and between leading portions of said film 64 and covering sheet 58.

After film 64 has been exposed, sheet 58 is returned within the envelope for covering said film and the entire assembly is adapted to be progressively subjected to compressive means, compression commencing at fluid container bearing portions thereof for releasing the fluid from separable edge portions 66a of the container and continuing throughout successive portions for spreading said fluid between said materials and processing the exposed area of film. A perforation 68 and a separable slot 68a connecting therewith are formed in the envelope, said perforation being adapted to receive a pin 70 (Fig. 2). When covering sheet 58 is slidably displaced, pin 70 serves to retain the envelope and enclosed film in magazine 34. When propulsive means are applied to envelope flap 48 slot 68a is adapted to separate when pulled against pin 70 and to release said pin therebetween enabling the assembly to be withdrawn from magazine 34.

Again referring to Fig. 1, mechanism for providing and controlling relative movement of aforesaid sprockets 61 and 62 for moving sheet 58, and rotatable means for advancing and compressing the unit as a whole are shown. Said advancing and compressing means comprise a pair of pressure rollers 72 and 74, one of said rollers being adapted to be moved toward and away from the other at various stages of rotation thereof, for a purpose presently to be described. The pressure rollers may preferably comprise surfacing 76 (Fig. 9) of a suitably yielding material such as rubber or the like for frictionally engaging portions of envelope 38. A torsion mainspring 77 (Fig. 9) is mounted within pressure roller 72, said spring having its extremities attached, respectively, to the pressure roller and to fixed shaft 78 (Figs. 4 and 9) and thereby providing rotation of said pressure roller 72. The pressure roller is rotatably mounted at one extremity upon said shaft 78 and is rigidly mounted upon a shaft 80 at its other extremity, said last-named shaft being adapted to rotate in bearing means 82 formed in web or casing portions 84 of the apparatus. A pair of driving gears 86 and 88 are rigidly connected to pressure roller 72 at each extremity thereof and are adapted to rotate therewith and transmit rotational force to other elements of the apparatus, said constructions associated with roller 72 and mainspring 77 providing, in effect, a spring motor.

Pressure roller 74 is rotatably mounted upon a pair of pivotal arms 90 and 92, said arms being mounted for rotation upon pivots 94 and 96, the latter being attached to web portions 32 and 84. Arms 90 and 92 are so biased by extension spring 98 as to urge pressure roller 74 toward pressure roller 72, said spring 98 being tensioned and connected to arms 90 and 92 by cables 100 and 102 passing over guides 104 and 106. Pressure roller 74 mounted on said pivotal arms 90 and 92 is positioned either in compressive contact with pressure roller 72 or spaced therefrom according to the rotational position of a pair of cams 108 and 110, rigidly attached to each extremity of pressure roller 74, relative to the rotational position of a pair of cams 112 and 114 rigidly attached to each extremity of pressure roller 72.

Figure 9:
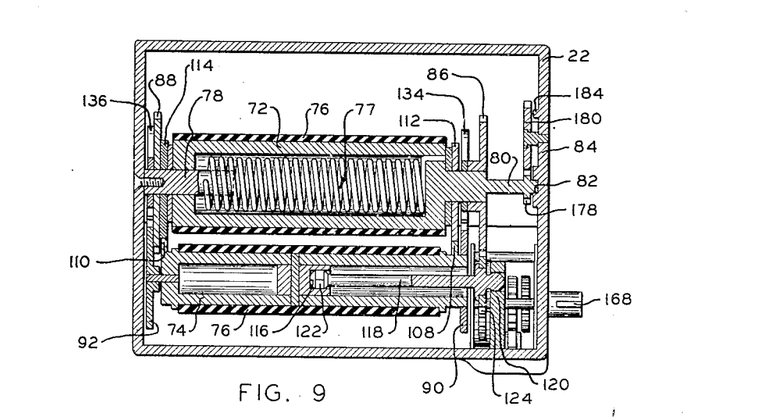
Fig. 9 is a cross-sectional, elevation view showing novel driving means of the mechanism.

Pressure roller 74, shown sectionally in Fig. 9, comprises a cylinder, within a central portion of which is formed a hexagonal socket 116. A shaft 118 extends within said cylinder, an extremity of said shaft external of said cylinder being rotatably mounted upon fixed bracket 120 and the opposite extremity of said shaft positioned within said cylinder comprising a hexagonal member 122 engaging socket 116. Shaft 118 comprises a gear 124 fixed thereto, said gear being actuated by driving gear 86. As shown, pressure roller 74 is of a full-floating type. Shaft 118 may be termed a floating torque shaft, and socket 116 and hexagonal member 122 comprise a form of universal joint. When driving gear 86 actuates gear 124 thus rotating shaft 118, said shaft 118 is adapted to apply substantially pure torque to the mid-portion of pressure roller 74 irrespective of whether roller 74 is in contact with or spaced from pressure roller 72, as determined by the aforesaid relative positions of cams, the compressive properties of said pressure rollers being substantially unaffected by any separative forces involved in engagement of gears 86 and 124.

Means for maintaining a spaced relation of the pressure rollers for a predetermined period after cams 108 and 110 have been rotated out of contact with cams 112 and 114 are provided and comprise a pair of pivotal members 126 and 128 mounted, respectively, on said pivotal arms 90 and 92, each of said members being similar in form and operation to the other. As shown in Fig. 1, pivotal member 126, mounted on arm 90 by pivot 127, comprises at one extremity a cam follower 126a adapted to engage cam 112, and at an opposite extremity a dog or latch 126b adapted to be rotated to a position beneath a fixed shoulder 130. Pivotal member 126 is biased or clockwise rotation by a small extension spring 132. When the cams have been rotated to relative positions indicated by the positions of cams 108 and 112 in Fig. 1, said cams have forced pressure roller 74 away from pressure roller 72 as permitted by pivotal movement of arm 90 against bias of spring 98, pivotal member 126 has been carried substantially downwardly by arm 90, cam follower 126a bears upon the short radius of cam 112, and dog 126b, accordingly, has been caused to pass beneath shoulder 130. It will be apparent that said dog 126b, once beneath shoulder 130, is adapted to hold arm 90 at maximum downward position and, accordingly, to hold pressure roller 74 spaced from pressure roller 72 as long as cam follower 126a rides on the short radius of cam 112. When the long radius of cam 112 is rotated to a position adjacent cam follower 126a, pivotal member 126 is rotated thereby and dog 126b is withdrawn from shoulder 130, the pressure rollers accordingly being placed in compressive contact through bias applied to pivotal arm 90 by extension spring 98.

A yoke element comprising arms 134 and 136 and having a rod 138 rigidly interconnecting said arms, is mounted for independent rotation upon mounting means associated with pressure roller 72, namely, upon fixed shaft 78 and rotatable shaft 80. Yoke arm 134 comprises a gear sector 140 having shaft 80 as an axis. Pivotal arm 90 also comprises a gear sector 142 radial to pivot 94. The aforesaid gear sectors 140 and 142 engage one another, as shown, it being understood that yoke arm 136 and pivotal arm 92 comprise similarly engaging gear sectors (not shown). Sprockets 61 and 62 are mounted upon a shaft 144 in such manner as to rotate therewith, said shaft being rotatably mounted upon arms 134 and 136 of said yoke. A gear 146 is fixedly mounted to an extremity of shaft 144, said gear engaging driving gear 88 and being driven thereby. When pivotal arms 90 and 92 are rotated in a given direction for separating pressure roller 74 from pressure roller 72 as shown in Fig. 1, gear sector 142 is caused to rotate in a similar direction and gear sector 140 in an opposite direction. Accordingly, assuming rotation of arms 90 and 92 to be in a counterclockwise direction, gear sector 140 and the yoke bearing sprockets 61 and 62 are actuated to rotate in a clockwise direction, said rotation being adapted to bring said sprockets in contact with sheet material 58. It follows that when pressure roller 74 is pivoted away from pressure roller 72 the sprockets are caused to contact sheet 58, and when pressure roller 74 is pivoted toward pressure roller 72 the sprockets are removed from sheet 58.

A gear train comprising gears 148, 150, 152, 154, 156, 158, 160 and 162 connects driving gear 86 with a speed governor 164, said governor serving to control the rotational speed of pressure rollers 72 and 74. Gear 152 is rigidly attached to a shaft 166 adapted to extend exteriorly of a camera casing, said shaft having rotational means such as key means 168 attached to the extremity thereof. Said key is provided both for manually winding mainspring 77 and for manually rotating sprockets 61 and 62 to remove covering sheet 58 from envelope 38. Means for releasably holding the mainspring under tension during winding comprise, respectively, ratchet 170 mounted upon gear 160, pawl 172 pivotally mounted upon stud 173 and biased by spring 174 for normally engaging said ratchet, and release button 176 for lifting said pawl from contact with said ratchet enabling mainspring 77 to provide rotational driving force to the aforesaid elements. A pinion 178 is rigidly attached to shaft 80 and is thereby adapted to rotate according to rotation of pressure roller 72. A spur gear 180 rotatably mounted upon casing 22 (Fig. 9) and having pin 182 on a surface thereof engages said pinion 178 and is adapted to be rotated thereby. A limit stop 184 extending from casing 22 is positioned so that pin 182 may be rotated to contact therewith, said limit stop permitting rotation of gear 180 through slightly less than 360° and limiting rotation of other elements according to the gear ratios embodied in the apparatus. Said gear ratios will presently be described in terms of movement of the elements and materials in accordance therewith.

A snout-like member 185 having a passage 186 formed therein and comprising light-shielding strips 188 attached thereto adjacent the outlet of said passage is pivotally connected to casing 22, said member being adapted to have opaque sheet 58 advanced and temporarily retained therewithin without admitting actinic light to casing 22. Suitable means for attachment of said member 185 to casing 22 comprises a ball portion 190 of said member 185 adapted to be frictionally held within socket portion 192 associated with casing 22. As indicated in constructions of Fig. 1, member 185 may be pivoted in a clockwise direction to idle position adjacent casing 22, detent 194 serving to releasably hold the member in said position. In the functional position of member 185 shown in Fig. 1 passage 186 is in register with an aperture 196 formed in casing 22, it being apparent that ball 190 provides a closure for said aperture when member 185 is pivoted from functional position. Member 185 enables a shorter camera casing than would otherwise be possible. Guide means 198 and 200 extend from inner portions of casing 22 adjacent said aperture 196 for leading sheet materials thereinto.

Operation of the apparatus involves movements of parts which will be described in accordance with the viewing position of Figs. 1, 2, 5, 6, 7, and 8. Wherein certain parts having a similar function are provided adjacent each extremity of the pressure rollers, operation of but one of said parts may be described herein. Before loading the camera, button 176 is held depressed and, supposing mainspring 77 to be tensioned, the apparatus is driven by said mainspring until pin 182 has been rotated in a clockwise direction to a position in contact with limit stop 184. Door 24 (Fig. 1) may then be opened and magazine 34 (Fig. 2) containing a plurality of units 36 inserted in chamber 30 (Fig. 1). Key 168 is then manually rotated in a clockwise direction, said rotation providing, through gears 152, 150, 148 and 86, rotation of pressure roller 72 and associated cam 112 in a counterclockwise direction, accordingly tensioning mainspring 77. Rotation of gear 86 engaging gear 124 coincidentally provides rotation of pressure roller 74 and associated cam 108 in a clockwise direction, the rotational speed of roller 74 being more rapid than that of roller 72 due to the diameter of gear 86 being greater than that of gear 124. The ratio of gear 124 to gear 86 is predetermined whereby several revolutions of the pressure rollers and cams are permitted for tensioning mainspring 77 prior to positioning the long radius of one cam adjacent the long radius of the other. When the long radii of said cams are adjacent one another, pressure roller 74 is thereby caused to be pivoted out of contact with pressure roller 72, pivotal member 126 is rotated in a clockwise direction to maintain separation of the pressure rollers, and yoke arm 134 is rotated in a clockwise direction so that sprocket 61 is caused to engage sheet material 58, continued manual rotation of key 168 providing removal of said sheet 58.

Figure 4:
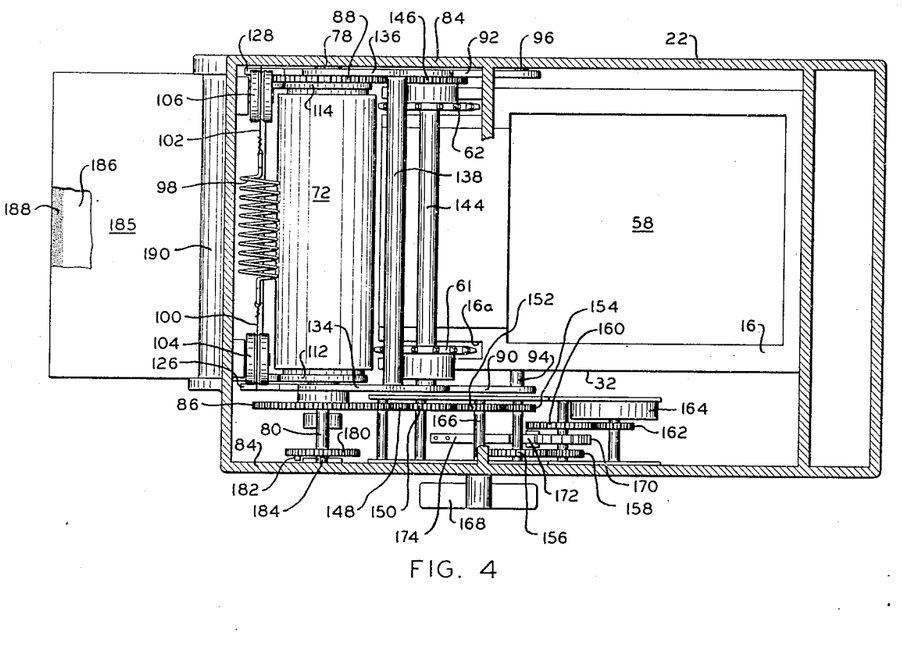
Fig. 4 is a schematic plan view of the apparatus shown in Fig. 1.
Figure 5:
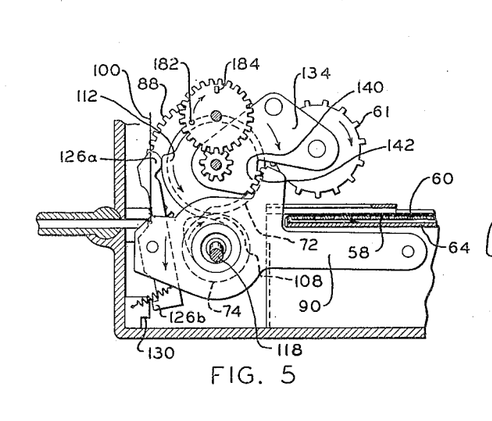
Figs. 5 through 8 are schematic, fragmentary elevation views illustrating successive stages of operation of the mechanism.

Fig. 5, which assumes driving interconnection of elements shown in Fig. 1 and key means 168 of Fig. 4, illustrates a stage in the above-described operations associated with manual rotation of said key 168 whereat the long radius of cam 112 rotating in a counterclockwise direction and the long radius of cam 108 rotating in a clockwise direction are about to engage one another. Pivotal arm 90 is thereby being rotated in a counterclockwise direction against bias transmitted thereto by cable 100 and pressure roller 74 is commencing to move away from pressure roller 72. Pivotal member 126, biased for clockwise rotation by spring 132, is being carried substantially downwardly by arm 90 so that dog 126b will be enabled to pass beneath shoulder 130 when cam follower 126a leaves the long radius of cam 112 and contacts the short radius thereof. Gear sector 142 is actuating gear sector 140 to provide clockwise rotation of yoke arm 134 whereby sprocket 61, rotating in a clockwise direction, is being carried toward sprocket holes 60 of covering sheet 58 for slidably removing said covering sheet to enable exposure of film 64. Pin 182 has been rotated nearly 270° in a clockwise direction and is moving toward limit stop 184, further rotation of said pin to said limit stop being accompanied by clockwise rotation of sprocket 61 to a degree sufficient for removal of sheet 58.

Figure 6:
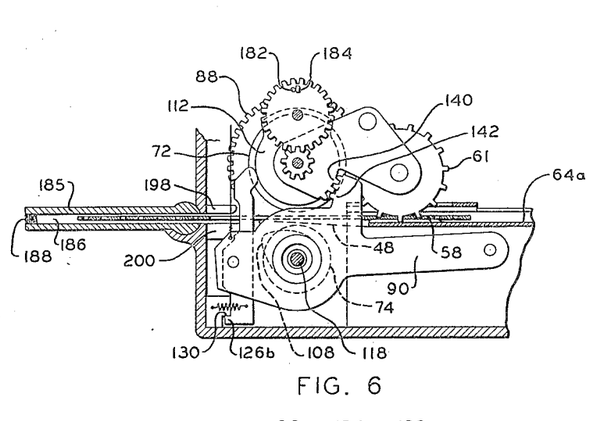

Fig. 6 assumes interconnection of driving elements shown in Fig. 1 and shows the relative position of elements and materials at a stage of operation whereat key 168 (Fig. 4) has been manually rotated in a clockwise direction to its limit, as evidenced by contact of pin 182 with limit stop 184. The various elements may be regarded as held stationary by pawl 172 engaging ratchet 170 as shown in Fig. 1. Mainspring 77 (Fig. 9) has been fully tensioned; cams 108 and 112 have been rotated out of contact with one another and dog 126b, positioned beneath shoulder 130 has served to maintain pressure roller 74 separated from pressure roller 72 for displacement of covering sheet 58 therebetween; sprocket 61 has been brought adjacent and maintained in contact with sheet material 58 and has served to remove said sheet material from the image area of the film. It is to be noted that sheet material 58 has been entirely removed from framed exposable area 64a of the film, leading portions of said covering sheet 58 having been passed between separated pressure rollers 74 and 72 and between guides 198 and 200, to passage 186 of member 185, said portions being retained within said passage. Coincidentally, flap 48 has been positioned between the separated pressure rollers. At the setting of elements shown in Fig. 6 the film area 64a is in readiness to be photographically exposed. After photographic exposure of the film, button 176 (Fig. 1) may be depressed, elements of the apparatus thereafter being spring driven in directions opposite to those described relative to Fig. 5, the first operation provided thereby being return of sheet 58 to superposition with film 64 within the envelope 38.

Figure 7:
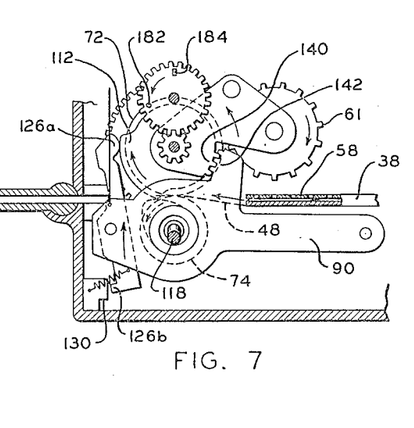

In Fig. 7 it is assumed that button 176 (Fig. 1) has been depressed and that the apparatus is spring driven through gearing shown in Fig. 1. Accordingly, the directions of rotation of elements shown in Fig. 7 are the reverse of those of the manually rotated elements shown in Fig. 5. In Fig. 7, sprocket 61 has returned covering sheet 58 within envelope 38; the long radius of cam 112 has actuated cam follower 126a thereby removing dog 126b from shoulder 130, enabling pivotal arm 90, urged by spring 98 (Fig. 1), to lift sprocket 61 from sheet material 58 through the medium of aforesaid gear sectors 142 and 140, and enabling said arm to carry pressure roller 74 toward pressure roller 72. Pressure rollers 72 and 74 are shown frictionally engaging envelope flap 48, the entire unit 36, accordingly, being in process of moving toward said pressure rollers for compression therebetween. Pin 182 has moved approximately 90° from limit stop 184. Coincidentally with the aforesaid operations shown in Fig. 7, it will be understood that speed governor 164 (Fig. 1) is operative to control the speed of rotation of all rotatable elements of the apparatus and thus to control the speed of movement of unit 36 between the pressure rollers.

Figure 8:
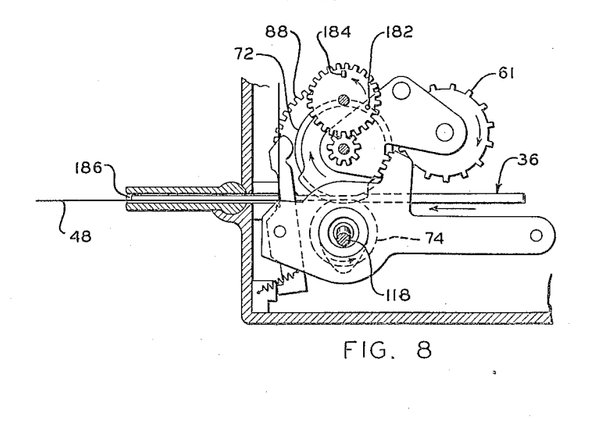

In Fig. 8 the various spring-actuated elements are shown at a more advanced stage of rotation as indicated by the position of pin 182 moving toward limit stop 184, directions of said rotation being similar to those shown in Fig. 7. Unit 36 is represented as undergoing compression between pressure rollers 72 and 74, it being understood that said compression provides spreading of the aforesaid processing fluid between the exposed film and sheet material 58. Film unit 36 is passed into a light-tight passage 186 after being compressed and, when the entire unit has been advanced between the pressure rollers, portions of said unit will extend beyond light-shielding strips 188 (Fig. 1) and may be grasped so that the compressed unit 36 may be manually withdrawn from the apparatus.

It will be understood that certain modifications of the apparatus are possible within the scope of the invention. The driving mechanism could, for example, be actuated in both of the directions indicated by a handcrank, thus obviating mainspring 77. Alternatively, an electric motor, having suitable reversing mechanism associated therewith, could be employed for driving the mechanism in both said directions. Provided covering sheet 58 is formed of an opaque material and envelope constructions are suitable for protecting film 64 from further subjection to actinic light after said exposure, the snout-like element 185 could be dispensed with, in which instance aperture 196 formed in casing 22 and having suitable light-shielding material associated therewith would be suitable for permitting aforesaid movements of the materials. The form and relative dimensions of gears and cams shown could be modified in any manner consistent with providing a similar sequence of operations upon materials similar to those described herein.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Camera apparatus for use with a composite film unit, said unit comprising an envelope having an exposure aperture formed therein and containing, respectively, a photosensitive film, an opaque sheet material displaceably positioned between said film and exposure aperture, and a film-processing fluid releasably contained between facing surfaces of said film and sheet material to one side of said exposure aperture, said apparatus comprising, in combination, means for mounting said film unit so that said photosensitive film is positioned in the focal plane, said mounting means having an aperture formed in one end thereof for slidable removal of said unit after exposure of said photosensitive film, means adapted to engage said opaque sheet material and to cooperate with said aperture in said mounting means for slidably displacing said sheet material from said photosensitive film to permit photographic exposure of the latter and for returning said sheet material to original position after said exposure, and means comprising a pair of pressure-applying surfaces mounted adjacent the aperture of said mounting means for the film unit, said surfaces being adapted to compress said film unit during advancement of said unit between said surfaces, progressive subjection of said composite unit to compression providing release of the processing fluid and spreading of said fluid between facing surfaces of said exposed photosensitive film and said opaque sheet material.

2. Camera apparatus for use with a composite film unit, said unit comprising an envelope having an exposure aperture formed therein and containing, respectively, a photosensitive film, an opaque sheet material displaceably positioned between said firm and exposure aperture, and a film-processing fluid releasably contained between facing surfaces of said film and sheet material to one side of said exposure aperture, said apparatus comprising, in combination, a magazine for mounting a plurality of said film units so that the photosensitive film of each unit may be successively positioned in the focal plane for exposure, said magazine having an aperture formed in one end thereof through which each film unit may be released, means adapted to engage said opaque sheet material and to cooperate with the aperture in said magazine for slidably displacing said sheet material from said photosensitive film to permit photographic exposure of the latter and for returning said sheet material to original position after said exposure, and means comprising a pair of pressure rollers mounted adjacent the aperture of said magazine, one of said rollers being mounted for translational movement toward and away from the other whereby at a given position of said translationally movable roller said opaque sheet material may be passed freely between both said rollers and at another position of said translationally movable roller said film unit may be subjected to compression between said rollers, progressive subjection of said composite unit to compression providing reelase of the processing fluid and spreading of said fluid between facing surfaces of said exposed photosensitive film and said opaque sheet material.

3. Camera apparatus for use with a composite film unit, said unit comprising an envelope having an exposure aperture formed therein for admitting light from a subject image and containing, respectively, a photosensitive film, an opaque sheet material normally positioned between said film and exposure aperture and adapted to be slidably removed through an unsealed portion of said envelope comprising a flap, and a film-processing fluid releasably contained between facing surfaces of said film and sheet material to one side of said exposure aperture, said apparatus comprising, in combination, a magazine for mounting a plurality of said film units so that the photosensitive film of each unit may be successively positioned in the focal plane for exposure, said magazine having an aperture formed in one end thereof through which each film unit may be released, reversibly rotatable sheet-advancing means adapted to engage said opaque sheet material and to cooperate with said aperture in said magazine for slidably displacing said sheet material from said photosensitive film to enable photographic exposure of the latter and for returning said displaced sheet material to original position after said exposure, and means comprising a pair of pressure rollers mounted adjacent the aperture of said mounting means for the film unit, one of said rollers being mounted for translational movement toward and away from the other whereby at a given position of said translationally movable roller said opaque sheet material may be passed freely between both said rollers and at another position of said translationally movable roller said film unit may be subjected to compression between said rollers, progressive subjection of said composite unit to compression providing release of the processing fluid and spreading of said fluid between facing surfaces of said exposed photosensitive film and said opaque sheet material.

4. Camera apparatus for use with a composite film unit of a type comprising a photosensitive layer, another layer displaceably superposed on said photosensitive layer, a film-processing fluid releasably contained between said layers, and an envelope comprising an aperture for admitting light when said superposed layer is displaced, said apparatus comprising, in combination, a magazine for mounting a plurality of said film units so that the photosensitive layer of each unit may be successively positioned in the focal plane for exposure, said magazine having an aperture formed in one end thereof through which each film unit may be released, means comprising a chamber having access means thereinto for releasably holding said magazine in the camera, one side of said chamber comprising a plate for framing the image of an exposure and another side having an aperture formed therein adapted to have said film unit passed therethrough, means adapted to engage said superposed layer and to cooperate with the aperture in said magazine for slidably displacing said superposed layer from said photosensitive layer to permit photographic exposure of the latter and for returning said superposed layer to original position after said exposure, and means comprising a pair of pressure rollers mounted adjacent the aperture of said magazine, one of said rollers being mounted for translational movement toward and away from the other whereby at a given position of said translationally movable roller said superposed layer may be passed freely between both said rollers and at another position of said translationally movable roller said film unit may be subjected to compression between said rollers, said unit, when progressively subjected to compression, having said fluid released and spread between said layers thereof for processing the exposed photosensitive layer.

5. Camera apparatus for use with a composite film unit of a type comprising a photosensitive layer, an opaque layer displaceably superposed on said photosensitive layer, a film-processing fluid releasably contained between said layers, and an envelope comprising an aperture for admitting light of a photographic exposure to said photosensitive layer when said opaque layer is displaced, said apparatus comprising, in combination, a magazine for mounting a plurality of said film units so that the photosensitive layer of each unit may be successively positioned in the focal plane for exposure, said magazine having an aperture formed in one end thereof through which each film unit may be released, reversibly rotatable sheet-advancing means adapted to engage said opaque layer and to cooperate with said aperture in said magazine for slidably displacing said opaque layer from said photosensitive layer to enable photographic exposure of the latter and for returning said displaced opaque layer to original position after said exposure, means comprising a pair of pressure rollers mounted adjacent the aperture of said magazine, one of said rollers being mounted for translational movement toward and away from the other whereby at a given position of said translationally movable roller said opaque layer may be passed freely between both said rollers and at another position of said translationally movable roller said film unit may be subjected to compression between said rollers, casing means having a slot formed therein adjacent said pressure rollers, said slot being adapted to have said film unit passed therethrough after being subjected to said pressure rollers, and means comprising a substantially rectangular member pivotally attached to said casing and having a slot extending therethrough which, at one position of said rectangular member, is adapted to be in register with said slot in the casing so that said film unit may be passed through both said slots after compression, said rectangular member also being adapted to be pivoted to another position against said casing and to provide a closure for said casing slot, said film unit, when progressively subjected to compression, having said fluid released and spread between said layers thereof for processing the exposed photosensitive layer.

6. Camera apparatus for use with a composite film unit of a type comprising a photosensitive layer, an opaque layer displaceably superposed on said photosensitive layer, a film-processing fluid releasably contained between said layers, and an envelope comprising an aperture for admitting light of a photographic exposure to said photosensitive layer when said opaque layer is displaced, said apparatus comprising, in combination, a magazine for mounting a plurality of said film units so that the photosensitive layer of each unit may be successively positioned in the focal plane for exposure, said magazine having an aperture formed in one end thereof through which each film unit may be released, reversibly rotatable sheet-advancing means adapted to engage said opaque layer and to cooperate with said aperture in said magazine for slidably displacing said opaque layer from said photosensitive layer to enable photographic exposure of the latter and for returning said displaced opaque layers to original position after said exposure, means comprising a pair of pressure rollers mounted adjacent the aperture of said magazine, one of said rollers being mounted for translational movement toward and away from the other whereby at a given position of said translationally movable roller said opaque layer may be passed freely between both said rollers and at another position of said translationally movable roller said film unit may be subjected to compression between said rollers, casing means having a slot formed therein adjacent said pressure rollers, said slot being adapted to have said film unit passed therethrough and being so positioned with respect to the pressure rollers and magazine aperture that the film unit and the opaque layer thereof may be moved in a single plane from the magazine through said slot, and means comprising a substantially rectangular member pivotally attached to said casing and having a light-shielded slot extending therethrough which, at one position of said rectangular member, is adapted to be in register with said slot in the casing and to lie in the aforesaid plane so that said opaque layer and film unit may be moved simultaneously within both said slots, said rectangular member also being adapted to be pivoted to another position against said casing and to provide a closure for said casing slot, said film unit, when propressively subjected to compression, having said fluid released and spread between said layers thereof for processing the exposed photosensitive layer.

7. Camera apparatus for use with a composite film unit of a type comprising a photosensitive layer, an opaque layer displaceably superposed on said photosensitive layer, a film-processing fluid releasably contained between said layers, and an envelope comprising an aperture for admitting light of a photographic exposure to said photosensitive layer when said opaque layer is displaced, said apparatus comprising, in combination, a magazine for mounting a plurality of said film units so that the photosensitive layer of each unit may be successively positioned in the focal plane for exposure, said magazine having an aperture formed in one end thereof through which each film unit may be loaded in the magazine and released after said exposure, means comprising a pair of reversibly rotatable, pivotally mounted sprockets adapted to be placed in contact with and to slidably displace said opaque layer thus enabling photographic exposure of said photosensitive layer, said sprockets being mounted adjacent the aperture of said magazine, means for photographically exposing said photosensitive layer, and means comprising a pair of pressure rollers mounted adjacent the aperture of said magazine, one of said rollers being mounted for translational movement toward and away from the other whereby at a given position of said translationally movable roller said opaque layer may be passed freely between both said rollers and at another position of said translationally movable roller said film unit may be subjected to advancement and compression between said rollers, thus providing release and spreading of said processing fluid between facing surfaces of said layers.

8. Camera apparatus for use with a composite film unit of a type comprising a photosensitive layer, another layer displaceably superposed on said photosensitive layer, a film-processing fluid releasably contained between said layers, and an envelope comprising an aperture for admitting light when said superposed layer is displaced, said apparatus comprising, in combination, means comprising a magazine for mounting a plurality of said film units so that the photosensitive layer of each unit is successively positioned in the focal plane for exposure, said magazine having an aperture formed in one end thereof through which each film unit may be released from said magazine, means comprising a pair of reversibly rotatable pivotally mounted sprockets adapted to be placed in contact with and to slidably displace said opaque layer thus enabling photographic exposure of said photosensitive layer, said sprockets being mounted adjacent the aperture of said magazine means, means for photographically exposing said photosensitive layer, a pair of pressure rollers for advancing and compressing said film unit, one of said rollers comprising a cylindrical member enclosing a torsion spring connected respectively to said member and to fixed mounting means therefor, said spring providing rotation of said roller and said roller having at least a gear rigidly attached thereto for driving other elements of said apparatus, the other of said pressure rollers comprising a cylindrical member mounted for pivotal movement toward and away from said first-named pressure roller means, spring means biasing said pivotal mounting means of said second-named pressure roller so that said roller is urged toward said first-named pressure roller, and means for driving said pivotally mounted pressure roller comprising a full-floating torque shaft extending within said pressure roller, an extremity of said shaft and a socket centrally located within said roller comprising a universal joint, progressive subjection of said composite film unit to compression providing release of the processing fluid and spreading of said fluid between facing surfaces of said exposed photosensitive layer and said opaque layer.

9. Camera apparatus for use with a composite film unit of a type comprising a photosensitive layer, an opaque layer displaceably superposed on said photosensitive layer, a film-processing fluid releasably contained between said layers, and an envelope comprising an aperture for admitting light of a photographic exposure to said photosensitive layer when said opaque layer is displaced, said apparatus comprising, in combination, means comprising a magazine for mounting a plurality of said film units so that the photosensitive layer of each unit is successively positioned in the focal plane for exposure, said magazine having an aperture formed in one end thereof through which each film unit may be released from said magazine, means comprising a pair of reversibly rotatable, pivotally mounted sprockets adapted to be placed in contact with and to slidably displace said opaque layer thus enabling photographic exposure of said photosensitive layer, said sprockets being mounted adjacent the aperture of said magazine means, means for photographically exposing said photosensitive layer, a pair of pressure rollers for advancing and compressing said film unit, one of said rollers comprising a cylindrical member enclosing a torsion spring connected respectively to said member and to fixed mounting means therefor, said spring providing rotation of said roller and said roller having at least a gear rigidly attached thereto for driving other elements of said apparatus including said sprockets, the other of said pressure rollers comprising a cylindrical member mounted for pivotal movement toward and away from said first-named pressure roller means, spring means biasing said pivotal mounting means of said second-named pressure roller so that said roller is urged toward said first-named pressure roller, means for driving said pivotally mounted pressure roller comprising a full-floating torque shaft extending within said pressure roller and forming a universal joint with a socket centrally located within said roller, key means for manually rotating aforesaid means in a direction for tensioning said torsion spring, and pawl means engaging a ratchet for holding said torsion spring under tension, means for manually releasing said pawl providing progressive subjection of said composite film unit to compression and providing release of the processing fluid and spreading of said fluid between facing surfaces of said exposed photosensitive layer and said opaque layer.

10. Camera apparatus for use with a composite film unit, said unit comprising an envelope having an exposure aperture formed therein and containing, respectively, a photosensitive film, an opaque sheet material displaceably positioned between said film and exposure aperture, and a film-processing fluid releasably contained between facing surfaces of said film and sheet material to one side of said exposure aperture, said apparatus comprising, in combination, means comprising a magazine for mounting a plurality of said film units so that the photosensitive film of each unit is successively positioned in the focal plane for exposure, said magazine having an aperture formed in one end thereof through which each film unit may be released from said magazine, means comprising a pair of reversibly rotatable, pivotally mounted sprockets adapted to be placed in contact with and to slidably displace said opaque sheet material thus enabling photographic exposure of said photosensitive film, said sprockets being mounted adjacent the aperture of said magazine means, means for photographically exposing said photosensitive film, pressure roller means mounted adjacent said magazine aperture for advancing and compressing said film unit, means for driving said sprocket and said pressure roller means, and limit stop means comprising a rotatable member connected to driving means of said apparatus and adapted to be brought in contact with a fixed member for terminating movement of said driving means, progressive subjection of said composite film unit to compression providing release of the processing fluid and spreading of said fluid between facing surfaces of said exposed photosensitive film and said opaque sheet material.

11. Camera apparatus for use with a composite film unit, said unit comprising an envelope having an exposure aperture formed therein for admitting light from a subject image and containing, respectively, a photosensitive film, an opaque sheet material normally positioned between said film and exposure aperture and adapted to be slidably removed through an unsealed portion of said envelope comprising a flap, and a film-processing fluid releasably contained between facing surfaces of said film and sheet materials to one side of said exposure aperture, said apparatus comprising, in combination, means comprising a magazine for mounting a plurality of said film units so that the photosensitive film of each unit is successively positioned in the focal plane for exposure, said magazine having an aperture formed in one end thereof through which each film unit may be released from said magazine, means comprising a pair of reversibly rotatable, pivotally mounted sprockets adapted to be placed in contact with and to slidably displace said opaque sheet material thus enabling photographic exposure of said photosensitive film, said sprockets being mounted adjacent the aperture of said magazine means, means for photographically exposing said photosensitive film, a pair of pressure rollers for advancing and compressing said film unit, one of said rollers comprising a cylindrical member enclosing a torsion spring connected respectively to said member and to fixed mounting means therefor, said spring providing rotation of said roller and said roller having at least a gear rigidly attached thereto for driving other elements of said apparatus, the other of said pressure rollers comprising a cylindrical member mounted for pivotal movement toward and away from said first-named pressure roller means, spring means biasing said pivotal mounting means for said second-named pressure roller so that said roller is urged toward said first-named pressure roller, means for driving said pivotally mounted pressure roller comprising a full-floating torque shaft extending within said pressure roller and forming a universal joint with a socket centrally located within said roller, key means for manually rotating aforesaid means in a direction for tensioning said torsion spring, pawl means engaging a ratchet for holding said torsion spring under tension, means for manually releasing said pawl, cam means rigidly attached to each of said pressure rollers and adapted to cooperate with one another for separating said rollers at predetermined rotational positions thereof, pivotal means comprising a cam follower and a latch for releasably holding said pressure rollers in spaced relation to one another when separated by said cam means, and limit stop means comprising a rotatable member connected to driving means of said apparatus and adapted to be brought in contact with a fixed member for terminating movement of said driving means, progressive subjection of said composite film unit to compression providing release of the processing fluid and spreading of said fluid between facing surfaces of said exposed photosensitive film and said opaque sheet material.

12. Camera apparatus for use with a composite film unit, said unit having a photosensitive layer, an opaque layer adapted to be slidably moved relative to said photosensitive layer and to be compressed therewith, and a film-processing fluid releasably contained on a surface portion of one of said layers which is in face-to-face relation with a surface of the other of said layers during compression therewith, said apparatus comprising, in combination, means comprising a magazine for mounting a plurality of said film units so that the photosensitive layer of each unit is successively positioned in the focal plane for exposure, said magazine having an aperture formed in one end thereof through which each film unit may be released, means adapted to engage said opaque layer and to cooperate with the aperture in said magazine for slidably displacing said opaque layer from said photosensitive film to permit photographic exposure of the latter and for returning said opaque layer to original position after said exposure, means for photographically exposing said photosensitive layer, a pair of pressure rollers for advancing and compressing said film unit, one of said rollers being mounted for translational movement relative to and having a smaller diameter than the other of said rollers, means for driving said pressure rollers so that the roller of smaller diameter is rotated at a greater speed than the roller of larger diameter, cam means rigidly attached to each of said pressure rollers and adapted to contact one another for causing said roller of smaller diameter to move away from the other roller, the aforesaid speed differential of said rollers providing contact of the cams after a predetermined rotation of said roller of smaller diameter in excess of 360°, progressive subjection of said composite film unit to compression providing release of the processing fluid and spreading of said fluid between facing surfaces of said exposed photosensitive layer and said opaque layer.

13. Camera apparatus for use with a composite film unit, said unit having a photosensitive layer, an opaque layer adapted to be slidably moved relative to said photosensitive layer and to be compressed therewith, and a film-processing fluid releasably contained on a surface portion of one of said layers which is in face-to-face relation with a surface of the other of said layers during compression therewith, said apparatus comprising, in combination, means comprising a magazine for mounting a plurality of said film units so that the photosensitive layer of each unit is successively positioned in the focal plane for exposure, said magazine having an aperture formed in one end thereof through which each film unit may be released, pivotal yoke means mounting a pair of sprockets adapted to slidably displace and replace said opaque layer, said yoke comprising a gear sector, means for rotating said sprockets in clockwise and counterclockwise directions, a pair of pressure rollers for advancing and compressing said film unit, one of said rollers having a greater diameter than the other, means for driving said pressure rollers so that the roller of smaller diameter is rotated at a greater speed than the roller of larger diameter, pivotal arm means mounting one of said pressure rollers enabling said rollers to be spaced apart at a plurality of distances, said arm means comprising a gear sector engaging the gear sector of said yoke means, pivotal movement of said arm means producing pivotal movement of said yoke means in an opposite direction so that said pressure rollers and sprockets, respectively, are alternately brought in contact with and separated from materials of said film unit, means biasing said pivotal arm means for urging said pressure roller mounted thereon toward the other pressure roller, cam means rigidly attached to each of said pressure rollers and adapted to contact one another for causing said pivotally mounted roller to move away from the other roller, the aforesaid speed differential of said rollers providing contact of the cams after a predetermined rotation of said roller of smaller diameter in excess of 360°, and limit stop means comprising a rotatable member connected to driving means of said apparatus and adapted to be brought in contact with a fixed member for terminating movement of said driving means, said film unit, when progressively subjected to compression, having said fluid released and spread between said layers thereof for processing the exposed photosensitive layer.

14. Camera apparatus for use with a composite film unit, said unit having a photosensitive layer, an opaque layer adapted to be slidably moved relative to said photosensitive layer and to be compressed therewith, and a film-processing fluid releasably contained on a surface portion of one of said layers which is in face-to-face relation with a surface of the other of said layers during compression therewith, said apparatus comprising, in combination, means comprising a magazine for mounting a plurality of said film units so that the photosensitive layer of each unit is successively positioned in the focal plane for exposure, said magazine having an aperture formed in one end thereof through which each film unit may be released from said magazine, pivotal yoke means mounting a pair of sprockets adapted to slidably displace and replace said opaque layer, said yoke comprising a gear sector, means for rotating said sprockets in clockwise and counter-clockwise directions, a pair of pressure rollers for advancing and compressing said film unit, one of said rollers having a greater diameter than the other, means for driving said pressure rollers so that the roller of smaller diameter is rotated at a greater speed than the roller of larger diameter, pivotal arm means mounting one of said pressure rollers enabling said rollers to be spaced apart at a plurality of distances, said arm means comprising a gear sector engaging the gear sector of said yoke means, pivotal movement of said arm means producing pivotal movement of said yoke means in an opposite direction so that said pressure rollers and sprockets, respectively, are alternately brought in contact with and separated from materials of said film unit, means biasing said pivotal arm means for urging said pressure roller mounted thereon toward the other pressure roller, cam means rigidly attached to each of said pressure rollers and adapted to cooperate with one another for separating said rollers at predetermined rotational positions thereof, pivotal means comprising a cam follower and a latch for releasably holding said pressure rollers in spaced relation to one another when separated by said cam means, and limit stop means comprising a rotatable member connected to driving means of said apparatus and adapted to be brought in contact with a fixed member for terminating movement of said driving means, said film unit, when progressively subjected to compression, having said fluid released and spread between said layers thereof for processing the exposed photosensitive layer.

15. Camera apparatus for use with a composite film unit, said unit comprising an envelope having an exposure aperture formed therein for admitting light from a subject image and containing, respectively, a photosensitive film, an opaque sheet material normally positioned between said film and exposure aperture and adapted to be partially removed through an unsealed portion of said envelope comprising a flap, and a film-processing fluid releasably contained between facing surfaces of said film and sheet material to one side of said exposure aperture, said apparatus comprising, in combination, means comprising a magazine for mounting a plurality of said film units so that the photosensitive film of each unit is successively positioned in the focal plane for exposure, said magazine having an aperture formed in one end thereof through which each film unit may be released from said magazine, pivotal yoke means mounting a pair of reversibly rotatable sprockets adapted to slidably displace and replace said opaque sheet material, said yoke comprising a gear sector, means for photographically exposing said photosensitive film, a pair of pressure rollers for advancing and compressing said film unit, one of said rollers having a greater diameter than the other, means for driving said pressure rollers so that the roller of smaller diameter is rotated at a greater speed than the roller of larger diameter, a speed governor and gearing interconnecting said governor with said driving means for determining the rotational speed of said pressure rollers, pivotal arm means mounting one of said pressure rollers enabling said rollers to be spaced apart at a plurality of distances, said arm means comprising a gear sector engaging the gear sector of said yoke means, pivotal movement of said arm means producing pivotal movement of said yoke means in an opposite direction so that said pressure rollers and sprockets, respectively, are alternately brought in contact with and separated from materials of said film unit, means biasing said pivotal arm means for urging said pressure roller mounted thereon toward the other pressure roller, cam means rigidly attached to each of said pressure rollers and adapted to cooperate with one another for separating said rollers at predetermined rotational positions thereof, pivotal means comprising a cam follower and at latch for releasably holding said pressure rollers in spaced relation to one another when separated by said cam means, and limit stop means comprising a rotatable member connected to driving means of said apparatus and adapted to be brought in contact with a fixed member for terminating movement of said driving means, said film unit, when progressively subjected to compression, having said fluid released and spread between the exposed film and opaque sheet material for processing said film.

ELMER E. GARRETT.

No references cited.